United States Patent

[11] 3,572,803

[72] Inventor Wilhelmus Antonius Maria Pompe
Tolhuislaan 4, Den Dolder, Netherlands
[21] Appl. No. 774,034
[22] Filed Nov. 7, 1968
[45] Patented Mar. 30, 1971
Continuation-in-part of application Ser. No. 581,832, Sept. 26, 1966, now abandoned.

[54] METHOD AND APPARATUS FOR LIFTING A LOAD WITH A CRANE CABLE OR THE LIKE
47 Claims, 14 Drawing Figs.
[52] U.S. Cl..................................................... 294/81, 294/67
[51] Int. Cl..................................................... B66c 1/00
[50] Field of Search........................................... 294/67, 674, 86, 81, 86 (SC), 78, 78 (A); 212/41, 42.5, 9, 58, 59, 144; 214/(Inquired)

[56] References Cited
UNITED STATES PATENTS
| | | | |
|---|---|---|---|
| 2,999,716 | 9/1961 | Elberty.......................... | 294/67 |
| 2,925,300 | 2/1960 | Kelley........................... | 294/103 |
| 3,191,983 | 6/1965 | Cagcione....................... | 294/81 |

*Primary Examiner*—Harvey C. Hornsby
*Attorney*—Beveridge & DeGrandi

ABSTRACT: Suspending the load from a body which in turn is suspended from the crane cable, and relatively shifting the positions of the suspension point on the cable and the center of gravity of the combined body and load until in vertical alignment with the body and load disposed in a predetermined position which is usually horizontal. The relative shifting of the suspension point of the body from the cable and the center of gravity of the combined body and load may be effected either by shifting the cable suspension point or by shifting the load along the body. In addition it may be accomplished by counterweights movable along the body. In certain embodiments, a control arm is movably mounted on the body to sense the eccentricity of the load suspended from the body when the body and its load are lifted by the crane cable. Upon sensing the eccentricity, the control arm is employed to actuate a device such as a fluid motor to bring the cable suspension point and the combined center of gravity of the body and load into vertical alignment with each other. In another embodiment, the eccentricity of the load suspended from the body is sensed by a liquid level device mounted on the body to control a motive device employed in producing the alignment. In order to restore the body in a balanced position relative to the cable after the load is released from the body, an energy accumulator is provided to be charged with energy by virtue of vertical displacement of the cable suspension point which occurs either before or during the alignment operation. After the load is released the charged energy which in one embodiment is in the form of an energized spring, is employed to move the body about the cable suspension point until the body is restored to horizontal position.

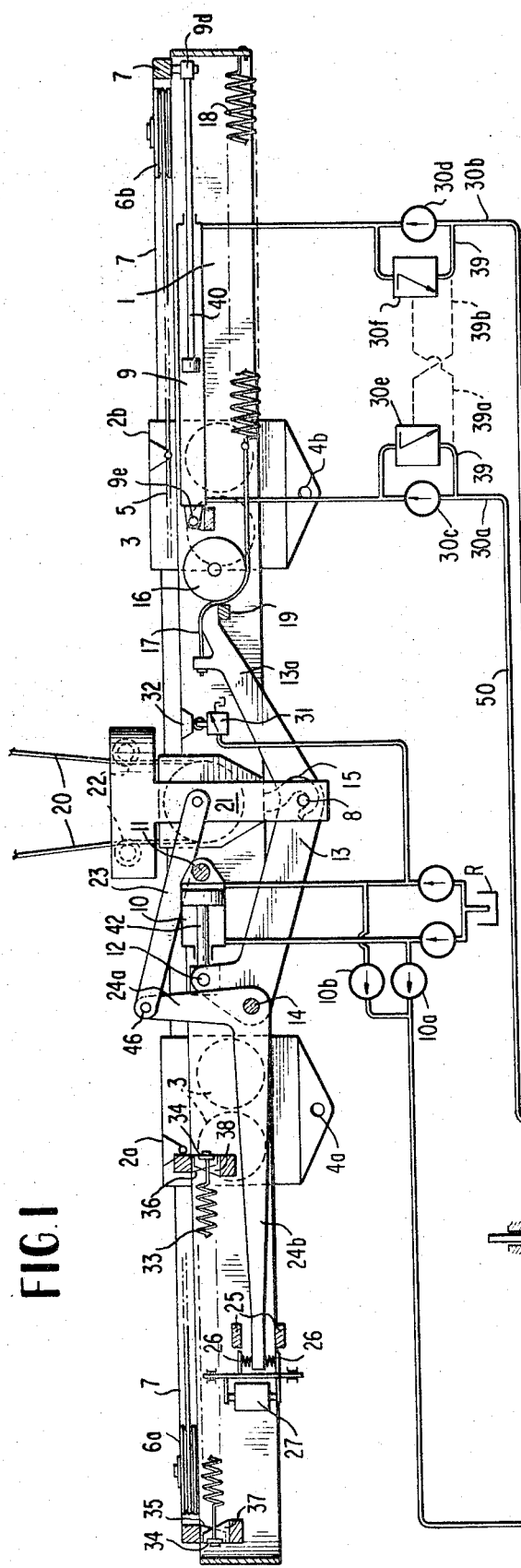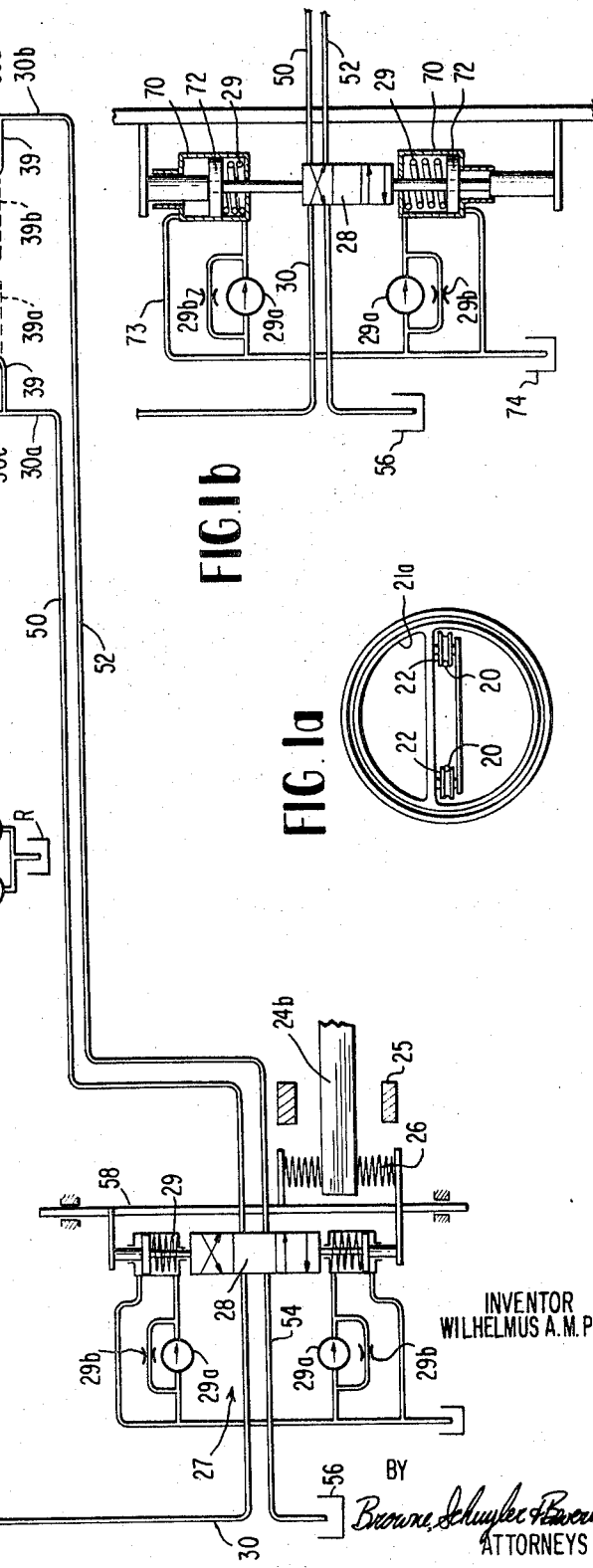
FIG.1  FIG.1a  FIG.1b
INVENTOR
WILHELMUS A. M. POMPE
BY
Browne, Schuyler & Beveridge
ATTORNEYS

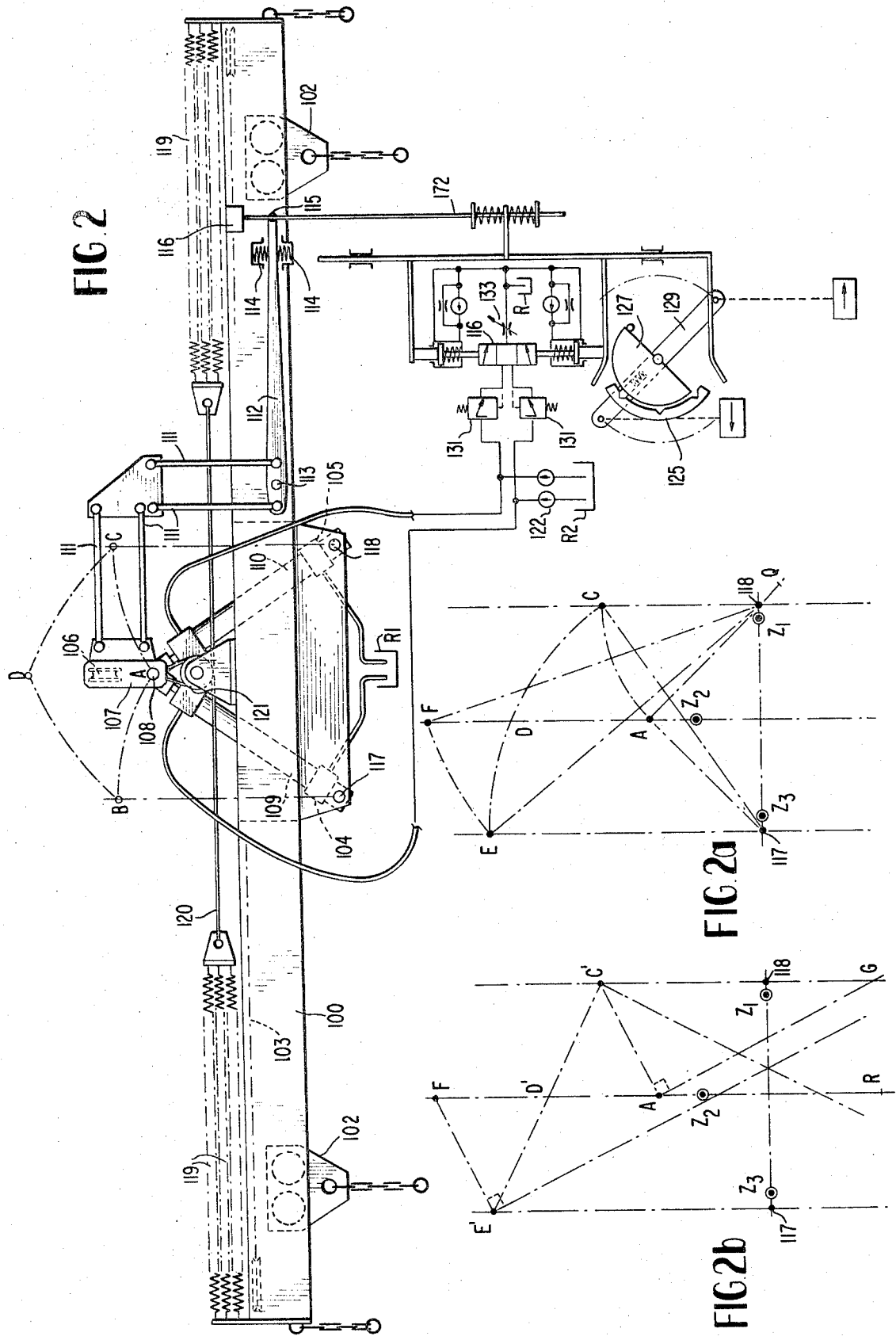

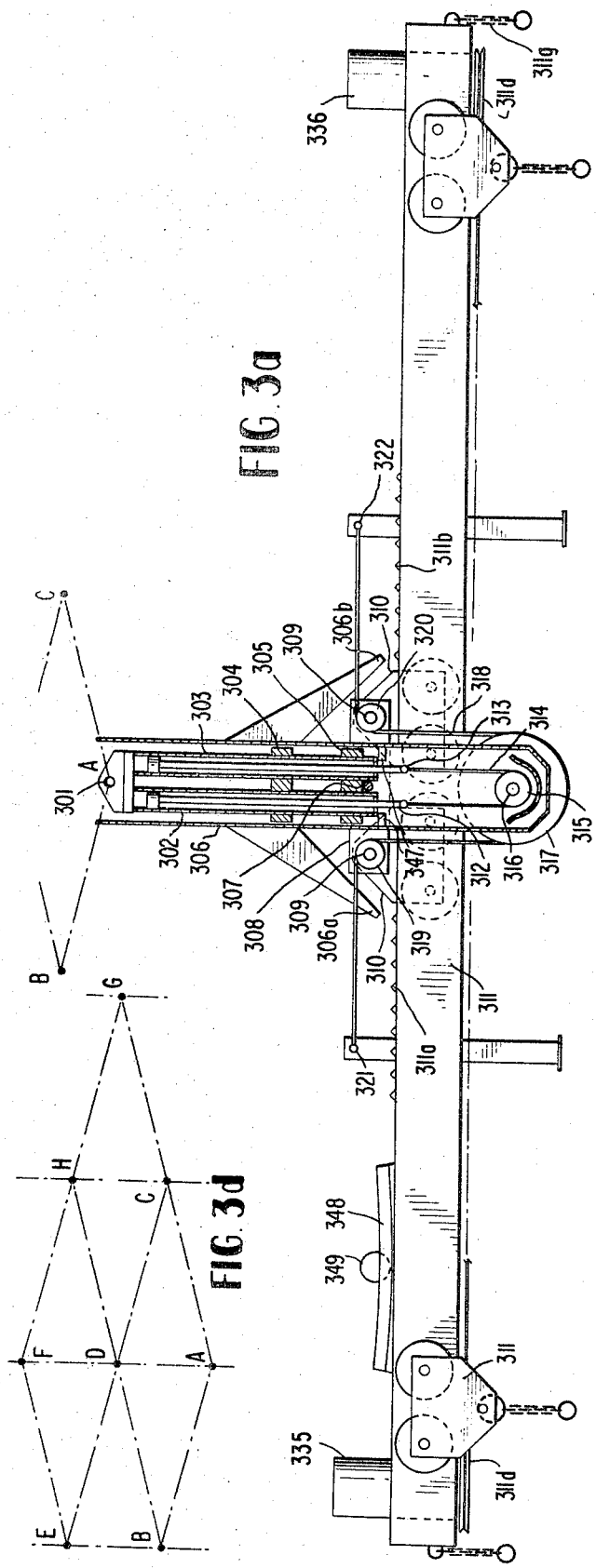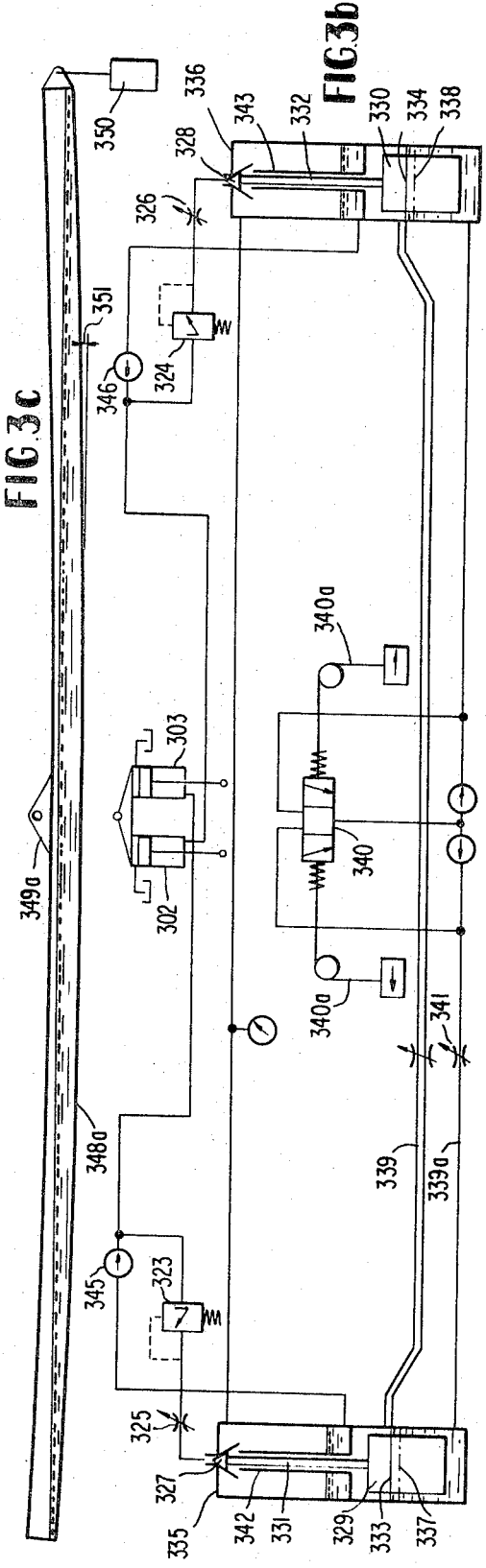

METHOD AND APPARATUS FOR LIFTING A LOAD WITH A CRANE CABLE OR THE LIKE

RELATED APPLICATIONS

This application is a continuation-in-part of copending U.S. application, Ser. No. 581,832 filed Sept. 26, 1966, now abandoned

SUMMARY OF INVENTION

The present invention relates to method and apparatus for lifting loads with a crane cable or the like. Although the present invention has particular utility with respect to lifting elongated loads while maintaining them in horizontal position, the present invention has other applicability in connection with the lifting and balancing of eccentric or other loads with the use of a crane cable.

In lifting and balancing eccentric loads by conventional methods, the point of attachment of the load to the crane cable is shifted by trial and error until the load is balanced in the desired position which usually is horizontal. This practice is not only troublesome and time consuming, but it also involves an added expense resulting from the fact that the crane must be kept for a unnecessarily prolonged time at the work site in order to complete the construction. In addition, the trial and error method in certain cases is not sufficiently accurate and results in certain portions of the load being damaged during lifting and placing by the crane. The net result with this conventional method is an increase in the overall construction cost as well as undue prolongation of the completion time of the construction.

It is therefore an object of the present invention to overcome the above-mentioned problems by the provision of a novel method and apparatus for lifting a load in a predetermined position with the use of a crane cable or the like. Included herein is the provision of such a method and apparatus for lifting an eccentric load while maintaining the load in a predetermined position.

A further object of the present invention is to provide method and apparatus for lifting elongated loads while maintaining the loads in a horizontal plane even though the load is not suspended from its center of gravity.

A further object of the present invention is to provide novel apparatus for use in lifting an eccentric load with a crane cable which apparatus moves the load into a predetermined balanced position. Included herein is the provision of such apparatus which will automatically align the cable suspension point over the center of gravity of the total load to balance the load in a predetermined position.

A still further object of the present invention is to provide such a method and apparatus which may be implemented on a commercial basis in connection with various types of loads to be lifted.

The above objects are achieved in a method wherein an alignment device is connected to the crane cable with the load connected to the alignment device. Assuming the total load (alignment device plus load to be lifted) is eccentrically positioned with respect to the crane cable, upon raising the crane cable and lifting the alignment device with the load suspended therefrom, the alignment device will rotate about the cable suspension point due to the eccentricity of the total load. This rotation of the alignment device is employed to actuate a sensing control mechanism which in turn actuates a motor or drive element which vertically aligns the cable suspension point and the center of gravity of the total load while positioning the alignment device and the suspended load in predetermined position which in most cases is horizontal. In certain embodiments the sensing control mechanism may include an arm or pendulum pivotally mounted on the alignment device to move in response to rotation of the alignment device about the cable suspension point to control the operation of the motor which produces the desired alignment.

Instead of employing a mechanical control member such as that described above, a liquid level mechanism may be employed on the alignment device to be responsive to rotation of the alignment device about the cable suspension point due to eccentric loading. This reaction of the liquid level mechanism is then employed to activate the motor or drive element for bringing the cable suspension point and the center of gravity of the combined alignment device and load into vertical alignment.

In the preferred embodiment the motor is of the fluid type including a drive piston which in one embodiment is connected to move the cable suspension point into alignment over the center of gravity of the total load. In another embodiment the motor is connected to move the load along the alignment device until the center of gravity is aligned below the cable suspension point. In another embodiment the center of gravity of the total load is shifted through the use of a counterweight which is adjusted along the alignment device by the motor until the center of gravity is in vertical alignment with the cable suspension point.

The fluid motor is supplied and exhausted with motive fluid under the control of a four-way slide valve. The latter valve is actuated by a slide which in turn is actuated through the sensing control mechanism.

In order to restore the alignment device to a horizontal position, after the load is released from the alignment device, there is provided an actuating mechanism that stores energy resulting from vertical displacement of the cable suspension point occurring either before or during the alignment operation. In one embodiment this mechanism may include spring means connected to the cable suspension point so as to be energized upon vertical displacement of the cable suspension point. Upon release of the load, the energy of the spring means is used to restore the alignment device in horizontal position.

Other objects and advantages of the present invention will become apparent from the following more detailed description taken in conjunction with the attached drawings in which:

FIG. 1 is a side elevational view, in schematic form, of apparatus embodying the invention and an associated control system;

FIG. 1a is a plan view of a frame employed in connecting a crane cable and hook to a main beam included in the apparatus of the present invention;

FIG. 1b is a schematic view of a control valve and related parts included in the control system;

FIG. 2 is a view similar to FIG. 1 but illustrating apparatus representing a second embodiment of the invention;

FIGS. 2a and 2b are diagrams illustrating paths of movement of the crane cable suspension point in conjunction with the embodiment shown in FIG. 2;

FIG. 3a is a view similar to FIG. 1 illustrating a third embodiment of the invention;

FIG. 3b is a schematic view of a liquid level system employed in the embodiment of FIG. 3a;

FIG. 3c is a modified sensing mechanism that may be employed in conjunction with the embodiment of FIG. 3a;

FIG. 3d is a diagram illustrating paths of movement of a crane cable suspension point in conjunction with the embodiment of FIG. 3a;

Figure 5:
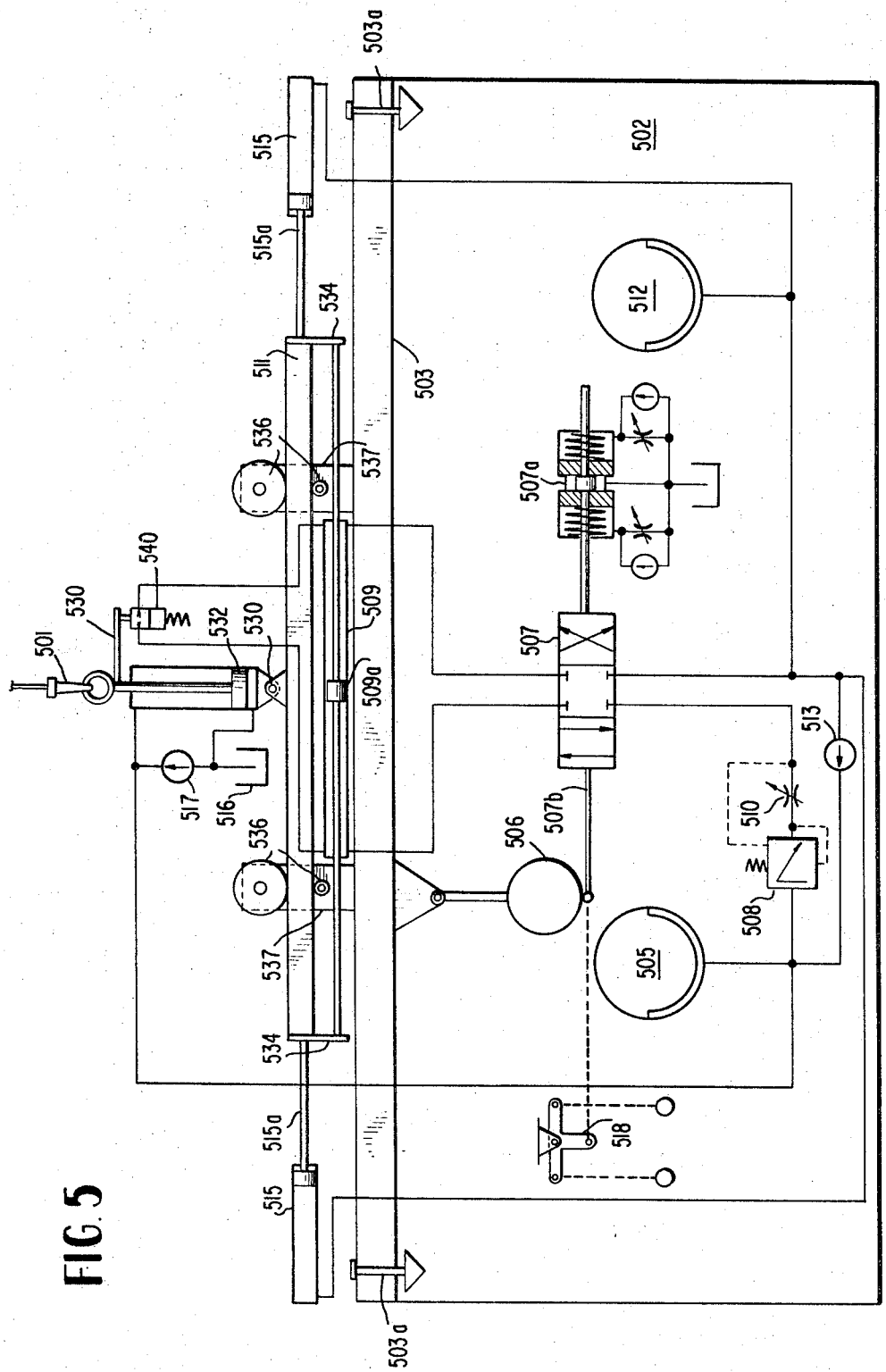
Figure 6:
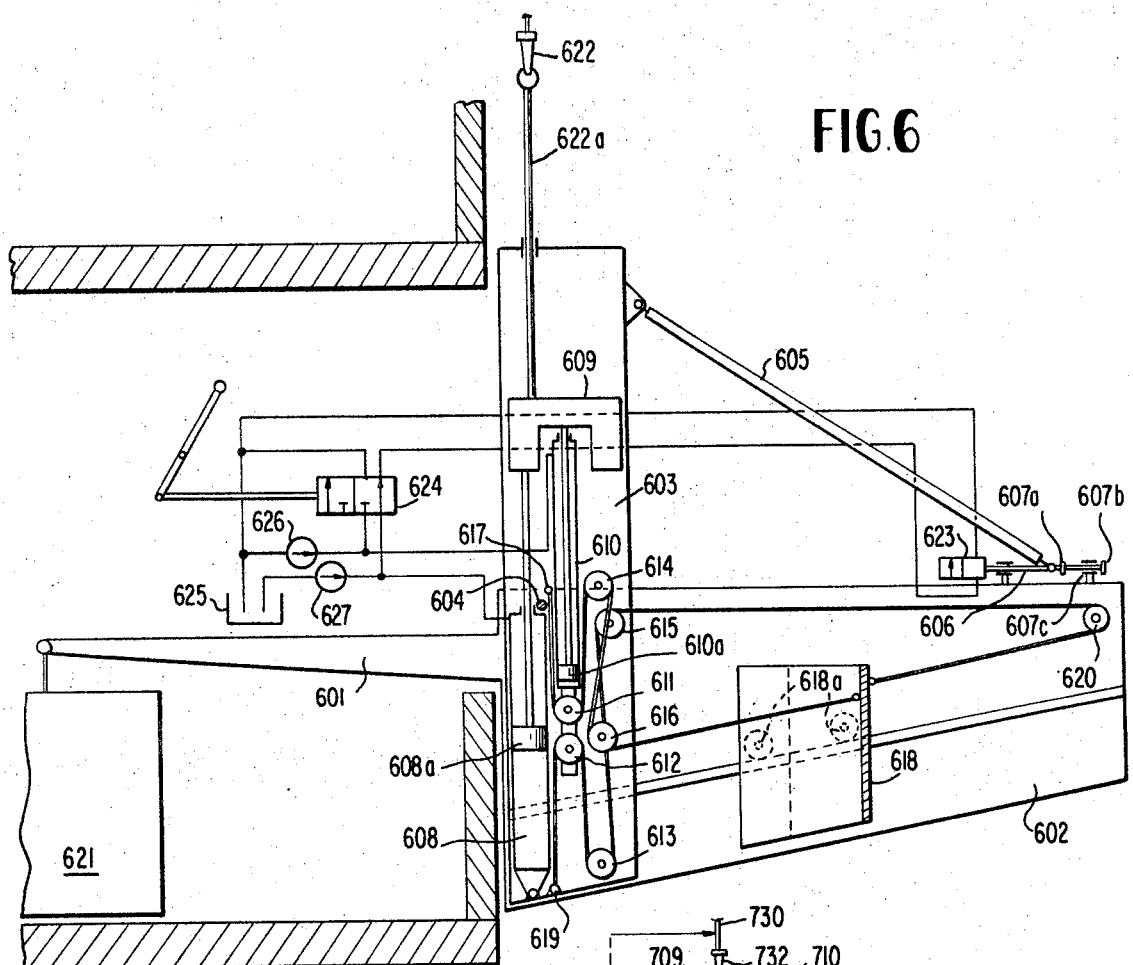
Figure 7:
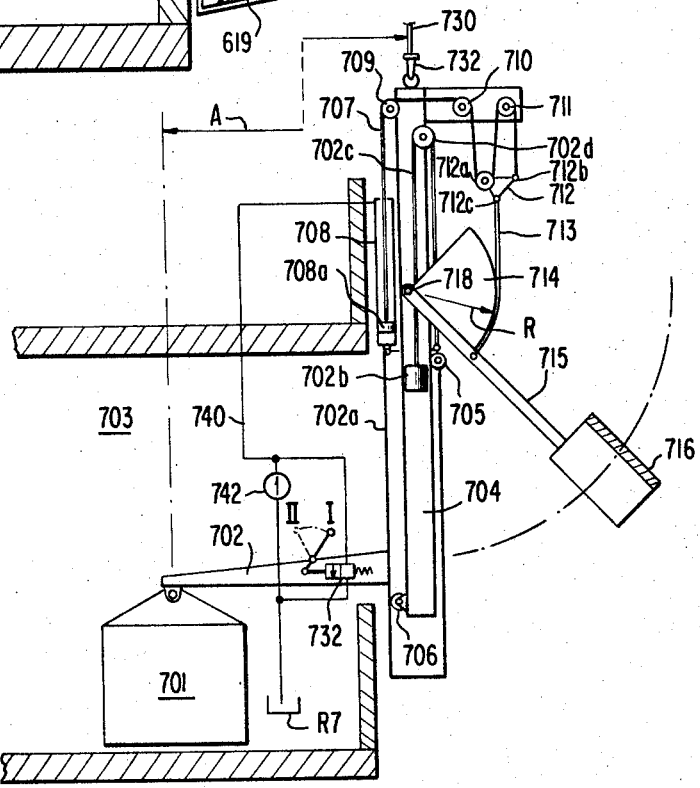

FIG. 5 is a view similar to FIG. 1 but illustrating a fifth embodiment of the invention which may be employed to lift a load in the form of a large container; and FIG. 6 is a side elevational view in schematic form illustrating a sixth embodiment of the invention employed in lifting a load into a closed space; and FIG. 7 is a view similar to FIG. 6 but illustrating a seventh embodiment of the invention

DETAILED DESCRIPTION

FIG. 1 Embodiment

Referring to FIG. 1 there is shown apparatus representing one embodiment of the present invention for use in lifting a load from a crane cable designated 20. The apparatus includes a main body 1 formed by elongated beams each having a generally U-shaped cross section and being fixed to each other in mutually facing relationships. The load is suspended from the body by means of trolleys 2a and 2b having suspension eyes 4a and 4b to which the load is attached. Trolleys 2a and 2b are movable along main beam 1 by means of rollers 3 which roll along the flanges of main body 1. In this particular embodiment, the vertical distance between the point of attachment of the load to the trolleys at 4a, 4b and the attachment point 8 of the crane cable is relatively small, a factory which will be described subsequently in greater detail.

Trolleys 2a, 2b are connected by a cable 5 which runs over pulleys 6a and 6b mounted in the opposite ends of an elongated frame 7 which in turn is mounted on body 1 for longitudinal movement relative to the body for a purpose to be described subsequently. Movement of cable about pulleys 6a, 6b will result in movement of trolleys 2a, 2b along body 1. However trolleys 2a, 2b are attached to opposite runs of the cable 5 (in curtain cord fashion) so that the trolleys are movable towards or away from each other an equal distance depending on the direction of rotation of the pulleys 6a, 6b. This movement of trolleys 2a and 2b as provided by the pulley and cable arrangement, is employed for adjusting the trolleys along the body during attachment of the load to the trolleys prior to the lifting operation.

In order to balance the load to be lifted in a predetermined position in accordance with the invention, trolleys 2a and 2b are also made movable by means of the frame 7 which as described above is longitudinally movable relative to the main beam or body 1. This movement of the trolleys as caused by the frame, allows the trolleys 2a and 2b to be moved in the same direction relative to the cable suspension point 8 to shift the center of gravity of the combined body including the main beam and other parts and the load suspended from the trolleys. When the center of gravity is shifted into vertical alignment with cable suspension point 8, the overall load will be balanced with respect to the crane cable. Additionally in the shown embodiment, main body 1 will also extend in a horizontal position when the suspension point 8 and the combined center of gravity are vertically aligned.

Movement of frame 7 along the body to move the trolleys 2a and 2b along main beam 1 to balance the load, is achieved by a motor shown as hydraulic cylinder 9 fixed to main beam 1 at 9e and having a piston 40 operatively connected to frame 7 at 9d to reciprocate the same relative to body 1. Hydraulic cylinder 9 is operated through means of a fluid motor or pump 10 mounted on body 1 to supply motive fluid to either side of cylinder 9 from a reservoir R. The cylinder of motor 10 is connected by a spindle 11 to body 1, and the piston rod 42 of the motor 10 is pivotally connected at 12 to an arm 13 which in turn is pivotally mounted on a spindle 14 which extends transversely in body 1. Suspension point 8 extends through the arm 13 and a crane cable hook 15 is attached to suspension point.

Beyond suspension point 8, arm 13 has an extension 13a which terminates adjacent a cable pulley 16 mounted on the main body 1. A cable 17 is connected to arm extension 13a while extending about the pulley 16 after which it is connected to a tension spring 18 anchored with respect to the body 1. When body 1 does not have a load suspended therefrom, spring 18 is in generally relaxed condition however it is preferable that spring 18 be slightly tensioned when no load is on body 1. Arm extension 13a abuts against a stop 19 fixed to the body 1 when there is no load suspended from the body. Arm 13 therefore does not move until a load is attached to trolleys 2a, 2b and lifted by crane cable 20.

Crane cable 20 is guided in a frame 21 by means of guide pulleys 22 located in frame 21 on opposite sides of a vertical line passing through suspension point 8. Frame 21 is free to swing a slight amount in a vertical plane relative to the alignment device and thereby move arm 23, which pivots about spindle 14 and in turn moves a control member. The control member is also pivotable about spindle 14 and includes an upwardly extending portion 24a and a horizontally extending portion 24b. Vertically extending arm portion 24a is pivotally connected at 46 to arm 23 which in turn is pivotally connected to pulley frame 21 above suspension point 8. Arms 13, 23 and 24a and frame 21 together form a parallelogram linkage which expands and retracts in response to movement of body 1 about suspension point 8 upon lifting and releasing the load as will be described. The parallelogram linkage is such that arm 24a remains generally vertical to body 1 if the frame 21 remains vertical thereto, even when spring 18 is extended by a load which is being lifted. Movement of the parallelogram linkage is employed to activate piston 42 of motor 10; piston 42 being connected to arm 13 of the linkage.

Motive fluid is pumped from reservoir R by motor 10 along a supply line 30 to be alternately connected with the opposite sides of cylinder 9 by means of a four-way slide control valve 27, 28. The latter valve alternately supplies and exhausts the opposite side of cylinder 9 by connecting conduits 50, 52 with either supply line 30 or exhaust line 54 which leads to a return pump or reservoir 56. Valve 27, 28 may also be moved to a position in which both lines 50, 52 are either blocked or exhausted.

Actuation of valve 27, 28 to supply and exhaust cylinder 9 is achieved through control arm 24b acting through springs 26 and a slide rod 58 with the latter being engageable with the opposite ends of the actuating stem of valve 27, 28. Valve 27, 28 per se is a conventional and well-known item and therefore need not be described in detail. Control arm 24b is limited in its movement by stops 25 fixed to body 1 on opposite sides of arm 24b. Springs 26 are on opposite sides of arm 24b and engage between the arm 24b and portions of slide 28. When no load is suspended from trolleys 2a, 2b, springs maintain arm 24b and slide 58 in neutral position with the arm 24b being equidistant from stops 25. In this position of the slide 58 and arm 24b, valve 27, 28 is also in neutral position as illustrated in FIG. 1.

The slide valve moves with delayed action which is provided by a resistance system including springs 29 provided in chambers 70 at the opposite ends of the slide valve. Springs 29 are weaker than springs 26. In the neutral position of the slide valve, pistons 72 are positioned in the opposite ends of chambers 70 as shown in FIG. 1. The stems on the opposite ends of the movable slide valve part are received in chambers 70 respectively where they are slidable in and relative to pistons 72 movable in chambers 70. When the slide valve moves in one direction, one piston will be moved to compress the associated spring 29 while the other piston and spring will remain in position as indicated in FIG. 1b. Pistons 72 divide chambers 70 into two subchambers. One subchamber is connected to a fluid supply line which has a one-way check valve 29a therein for admitting fluid into this subchamber. Exhaust of fluid from this subchamber is through means of a restrictor 29b placed in parallel with check valve 29a as indicated in FIG. 1b. The other subchamber communicates with a conduit 73 for supplying and exhausting fluid therefrom. It will be seen that when the slide valve is moved to compress one of the springs 29, the associated subchamber will be relieved of some of its fluid which will pass through the restrictor while bypassing check valve 29a. Spring 29 together with the restrictor 29b thus delay or retard the movement of the control valve 28. When the slide valve returns in the opposite direction there will be no retardation and, fluid will be admitted into the subchamber (which was just exhausted) through the check valve 29a. A reservoir 74 is provided for the resistance system.

Assuming that a load is eccentrically placed on one or both of trolleys 2a, 2b and the center of gravity of the load is to the left of suspension point 8; upon lifting the totality i.e. the main body 1 and the load, the main body 1 will turn about suspension point 8 in the vertical plane to the left. This will cause the parallelogram linkage to move and in turn piston 42 of motor 10 will be actuated. In addition, the uppermost spring 26 will be compressed by control arm portion 24b to move the slide valve 27, 28 to establish communication between lines 30 and 50 while exhausting the right-hand side of cylinder 9 through line 52. A short time thereafter, due to the delaying effect of resistances 29 provided in the hydraulic circuit, fluid will flow between motor cylinder 10 and the left side of cylinder 9 moving frame 7 and thus the loaded trolleys to the right to vertically align suspension point 8 with the center of gravity of the combined body and load while also placing the main body 1 in a horizontal position. During this motion, spring 18 is energized resulting from relative vertical displacement of the suspension point 9 relative to body 1. When body 1 reaches a horizontal position and the load is balanced, control arm 24b will return to neutral position thus causing slide valve 28 to quickly return to its neutral position in an accelerated manner thereby cutting off the flow of fluid into the left side of cylinder 9.

Upon release of the load from the suspension trolleys, body 1 will tilt towards the right momentarily in consequence of its center of gravity now being to the right of suspension point 8. As a result, lower slide spring 26 will be compressed by arm portion 24b causing slide valve 27 to open the connection between motor cylinder 10 and the right-hand side of cylinder 9 while opening the left-hand side of cylinder 9 to the exhaust as illustrated in FIG. 1b. Motor 10 will pump fluid into the right-hand side of cylinder 9 to move frame 7 to bring both trolleys 2a and 2b back again to their original balanced position with the main body 1 extending in horizontal plane. During this restoring operation, spring 18 which was previously energized by the vertical displacement of suspension point 8, actuates cable 17 to move the parallelogram linkage and in turn operate the piston in cylinder 10 which pumps motive fluid into the right-hand side of cylinder 9. Spring 18 thus aids the return of the beam to neutral position when the load is removed from the beam.

When the neutral position of the body is reached, a cam 32 fixed on movable frame 7 actuates a vent valve 31 which vents motor 10 to atmosphere. At this point spring 18 relaxes and no further displacement of frame 7 takes place.

In order to bias the trolleys 2a and 2b in the normal unloaded position, there is provided a spring 33 which is tensioned by plates 34 against abutments 35, 36 on the movable frame 7 and also by abutments 37 and 38 fixed to the main beam 1. If the frame 7 leaves its middle or normal position, spring 33 is expanded. Frame 7 is in the normal position when the apparatus including the main beam is unloaded. Preferably, the normal position of frame 7 is when the frame 7 is centered on the main beam. When a load is placed on the trolleys causing the frame to move along the beam to balance the load as described above, spring 33 will be expanded and thus energized so that when the load is removed the spring will urge the frame 7 back to the normal position. Spring 33 thus assists spring 18 in restoring the main beam to normal position upon release of the load. In certain cases spring 33 may be omitted particularly when the strength of spring 18 is sufficiently great.

Preferably safety devices generally designated 39 may be provided to prevent the main beam from reaching a highly inclined position as a result of the weight or eccentricity of the load. The safety device include one way or directional check valves 30c, 30d respectively provided in lines 50, 52 to permit motive fluid to flow into the opposite ends of cylinder 9 while preventing return flow. Return flow from the opposite ends of cylinder 9 is provided for by means of pressure-operated valves 30e and 30f which are respectively placed in parallel with lines 30a and 30b. Valves 30e and 30f are operated by the pressure in lines 30b and 30a respectively so that for example, when motive fluid is flowing through lines 30a into the left-hand side of cylinder 9, the pressure in that line will cause valve 30f to open to permit the right-hand side of cylinder 9 to be exhausted; the exhaust flow bypassing check valve 30d and entering into line 30b and back through line 52 to reservoir 56 through control valve 28. In operation when the main beaming inclines excessively so that the pressure in 9a at the left-hand side of the cylinder 9 is higher than line 30a, flow of motive fluid out of the left-hand end 9a of the cylinder 9 is prevented by directional check valve 30c thus preventing the beam to move into a even greater inclined position. It should be understood that safety devices 39 are provided as an extra safety measure however it should be understood that they may be omitted because directional valves 10a and 10b in the supply line 30 also have a retarding effect preventing overinclination of the beam.

It should be understood that the hydraulic circuit including the various valves is mounted on the main body 1 so as to form a self-contained system not requiring power from an external source.

FIG. 2 Embodiment

Referring to FIG. 2 there is shown a second embodiment of the invention which is simpler than the above-described embodiment although it is at the cost of lifting height which however in certain conditions does not matter. In this embodiment main beam 100 is provided by two mutually facing U-shaped beams which are fixed together to receive the rollers of trolleys 102 so that the trolleys are movable along the main beam. Trolleys are movable by means of a cable 103 trained about end pulleys mounted in the beam. However in the instant embodiment, the alignment of the cable suspension point 108 and the center of gravity of the combined body and load is achieved through moving the cable suspension point 108 relative to the body rather than moving the trolleys relative to the cable suspension point as in the above-described embodiment. Movement of trolleys 102 by cable 103 is employed only for attaching the load to trolleys 102. After attachment of the load, trolleys 102 remain in fixed position during lifting of the load.

The alignment in the present embodiment takes place by means of fluid cylinders and pistons 104 and 105 bone end of which are connected with respect to the body for pivotal movement about points 117 and 118 while the other ends converge towards a suspension plate 107 to which the pistons are pivotally connected. Suspension plate has a hole 106 for receiving the crane hook of the pistons in cylinders 104 and 105 is controlled by a slide valve 116 which is operated by a slide 172 under the control of control arm 112. Control arm 112 is mounted on the main body 100 for pivotal movement about pivot 113 and with the extremity of control arm 112 connected via rod 172 to slide 116 to operate the same as in the above-described embodiment.

Control arm 112 is also connected to suspension plate 107 by means of connecting links 111 so as to transmit motion to the connecting plate 107 when the main body is undergoing adjustment for alignment caused by vertical displacement of the connecting plate 107 relative to the body. This vertical displacement of connecting plate 107 in addition is employed to energize restoration springs 119 for restoring the main body 100 back to horizontal position when the load is removed from the trolleys. Springs 119 are connected with respect to the suspension plate 107 by means of a cable 120 trained about a pulley 121 such that relative vertical movement of the suspension plate 107 relative to the body will move the pulley to tension or relax the springs 119.

The method of operation of the control valve 116 is shown diagrammatically in a subsidiary drawing, right lower, and is like that of the valve described above wherein the valve is moved from its middle position by delay action and returned thereto undelayed. If the center of gravity of the load is to the left of the suspension point then the alignment device turns to the left. Thereby the arm 112 turns to the right relative to the alignment device and its end 115 moves the actuating slide 116 by delay action downwards. As a result, the space 110 of cylinder 105 first comes slowly into connection with the reservoir R whereby the cable suspension point 108 is displaced in relation to main beam 100 about pivot 117 of cylinder 104. By this means the piston in cylinder 105 is extended to move the suspension point 108 to the left in relation to the main beam until vertically aligned with the center of gravity of the combined body and load. The suspension point 108 is moreover displaced vertically with respect to the main beam. This vertical displacement being the source of all energy needed.

When the horizontal position is reached, i.e., the suspension plate 107 is vertical to the main beam, and arm 112 is also in its middle position. As a result of this, the control valve 116 goes quickly into its neutral middle position and flow of motive fluid from space 110 into reservoir R is no longer possible. Control valve 116 is moved away from its neutral middle position with delay action so that even when the alignment device still oscillates somewhat and rolls back, no movement from the cylinders will take place. If the totality swings too far then arm 112 is deflected up. After some time the valve 116 reacts slowly by which it exhausts some motive fluid from space 109. Attainment of the middle position in this manner takes place slowly. In order to put itself in equilibrium the spindle 108 can move in an area which is limited by the segments ABCD. A maximum displacement of the center of gravity can therefore take place through the path BC.

The erection possibilities of this construction are excellent. This will be explained by FIGS. 2a and 2b. The points 117 and 118 correspond to the turning points 117 and 118 of the cylinders 104 and 105. The points A, C and D in FIG. 2a correspond to the same points in FIG. 2. The points E and F arise when the pistons in cylinders 104 and 105 are extended downwards. Suppose this extension is such that point F can be reached by the turning point 108 in FIG. 2. The circle segment AC is covered when the center of gravity is situated a little to the left of point 118 (Z1). If after that the center of gravity is replaced a little to the right of points 117 (Z3), the circle segment CDE is covered by the suspension point 108. After unloading of the alignment device the segment EF is covered (center of gravity Z2), it being supposed that springs 119 are weak, so that the device is returned to its starting position after setting down the device.

The perpendicular on the relative trajectories of suspension point 108 never coincides with the center of gravity, so erection is possible in all cases. Suppose the same point F is to be reached by the alignment device of FIG. 1. The relative trajectory of suspension point 108 can then be represented by AC'D'E'F' in FIG. 2b, composed by straight lines. Suppose the center of gravity of the device and load is in point Z1, near point 118. If in that case the alignment device hangs free, the vertical passes the points A and Z1. While Z1 is to the right of the perpendicular on the trajectory AC' no adjustment of the device is possible. The same difficulties can occur after displacement of the center of gravity to the points Z3 and Z2.

After the release of the load the alignment device must return to its starting position. The energy necessary therefor is taken from energy accumulated which in the present case consists of springs 119. These are charged with energy which is obtained through the vertical displacement of the suspension point and of the center of gravity with respect to one another on lifting the load. By means of cables or chains 120 which run over the pulleys 123 lying alongside one another, to suspension point 108, the springs 119 exert their effect.

Upon return of the alignment device into its starting position, the pistons are again fully depressed in the cylinders 104 and 105. This is possible because the lower ends are continuously in open connection with reservoir R. The upper ends of cylinders 109, 110 are supplied by reservoir R return flow to which is prevented by check valves 122. Return flow from the cylinders to reservoir R is regulated by pressure reducing valves 131 and variable restrictor 133, resulting in a constant flow velocity, independent of the weight of the load thereby providing a security measure.

As an alternative to the horizontal sensing members 111, and 112, it is also possible to control valve 116 through means of a pendulum. For example, and with reference to FIG. 2, suppose that members 111 are omitted and arm 112 is set vertically, i.e., turned through 90° and has a weight attached to its free end, e.g., to the right of pivot 115 to thus act as a pendulum. Also, valve 116 is likewise turned through 90°. The alignment device then measures its horizontal position from the vertical position of the pendulum in relation to the main beam. Use of a pendulum is also illustrated in the FIG. 5 embodiment to be described subsequently.

Another embodiment is possible in which weaker springs 119 are selected so that the alignment device does not contract of its own accord but first goes into its middle position when it hangs unloaded on the lifting cable. The contraction then first takes place when it is set down. Since strong tension springs 119 can influence the readiness of cylinders 104, 105 to discharge, this measure may be necessary if relatively light loads are to be lifted. When a load hanging on the automatic alignment device is influenced by external forces, e.g. when attaching a construction element hanging on the device, the device will react correspondingly when it adjusts itself. This can be undesirable. Because of this, it may be necessary to fix the control means in the middle position so that no possibility of adjustment is available.

When loads have to be lifted in which the eccentricity of the total load is greater than the eccentricity to which the alignment device can be set, the alignment device can then also be set eccentrically itself whereby a doubled or increased range of adjustment to one side is possible. This may be effected in one way by adjusting the trolleys to shift the location of the point which is equidistant to both. In the modified device, the springs must be designed to permit the empty device to balance itself.

Referring to FIG. 2, a manual control 125 may be employed to operate valve 116 between various positions blocking or permitting flow of motive fluid. Control 125 may include a cam 127 rotated by a lever 129 to depress or release the stem of valve 116.

The main beams described in FIG. 1 and 2, fitted with an automatic alignment device, are suitable for transporting construction elements, concrete boarding or similar flat loads not standing in equilibrium. With other loads it can arise that the main beam with the trolleys is not necessary as a totality. It then suffices e.g., to provide eyes or hooks under the pivots 117 and 118 in FIG. 2, upon which the load can be suspended.

FIG. 3 Embodiment

Yet another embodiment of the invention is shown in FIG. 3 in which a suspension point 301 is provided at the top of two cylinders 302 and 303 which are coupled together at 304 and 305. Cylinders 302, 303 are mounted for vertical movement in a holder 306 which is pivotally mounted at 307 on a small beam 308, which small beam 308 is supported at its end via shafts 309 by trolleys 310. Trolleys 310 are movable along a main beam 311. A chain 314 is attached to the ends of piston rods 312 and 313 in cylinders 302, 303 which chain passes over a chain wheel 315 fixed on a shaft 316 which is rotatable in the lower end of holder 306. A pair of chain wheels 317 (two for symmetry) are fixedly secured on the ends of shaft 316. Shaft 316 carries the whole device via the chain 314 and the cylinders 302 and 303. Chains 318 pass over chain wheels 317 and over chain wheels 319 and 320, rotatably mounted on shafts 309, to connection points 321 and 322 on the main beams 311. Due to the weight of the alignment device and any load, pressure is generated under the pistons in the cylinders 302 and 303 when the device is in use. If hydraulic fluid is evacuated from cylinder 302, the end of the piston rod 312 will move downwardly while piston rod 313 remains stationary. Shaft 316 accordingly moves downwardly half the distance covered by the end of piston rod end 312 as does the alignment device itself carried thereby. In consequence of this downward movement, wheel 315 on shaft 316 will be turned to the left (counterclockwise) by chain 314 as will wheel 317 on the same shaft 316 with the result that holder 306 and trolleys 310 are moved to the left, relative to main beam 311, until stopped by 321. Suspension point 310 thus covers the distance AB relative to main beam 311. If on the other hand cylinder 303 is evacuated suspension point 1 will follow the line AC in the opposite direction.

When cylinder 303 is evacuated after cylinder 302 is evacuated, the relative path BD (see FIG. 3d) will be followed by suspension point 301. By doubling the length of the cylinders, the suspension point 301 can move in the plane ACHFEB and can also follow the paths AG and GF. This may be necessary if a load is suspended on chain 311g of FIG. 3a. With such a great eccentricity, the suspension point of the device can take up positions on one side of the middle position, whereby both suspending members can be totally exhausted. If a weak energy accumulator is used, the line GF is covered after setting the load. This enables the device to be used for moving a load hanging on a crane cable horizontally in a covered space, using the device as a counterbalance. The point 322 then has to be displaced to the right.

In FIG. 3b is given an example of the operation of the device schematically. Cylinders 302 and 303 can be exhausted via pressure reducing valves 323 and 324. The velocity of evacuation can be regulated by resistances in the form of variable restrictors 325 and 326 and is independent of the weight of the load. Evacuation is controlled by valves 327 and 328, which are normally kept in closed positions by floats 328 and 330 via connecting rods 331 and 332 due to the liquid levels 333 and 334 in double tanks 335 and 336. The valves will open when the liquid levels are reduced to that represented by 337 and 338. Tanks 335 and 336 are intercommunicated at their upper ends by means of an elongated conduit 339 which is parallel to the main beam. Tanks 335 and 336 are also communicated at their lower ends by a conduit 339a of smaller diameter than 339.

Suppose now that the center of gravity of the device and the load is to the right of the suspension point on the crane cable so that the alignment device turns to the right. The liquid in elongated conduit 339 will stream to the right and as a result, the level 334 will rise and valve 328 will remain closed. With valve 340 in position to the right, the liquid in small tube 339a will move to the right too, although much more slowly, its velocity being controllable by variable resistance 341. As a result the level 333 will fall slowly. When level 337 has been reached, valve 327 opens and cylinder 303 will deflate, causing a movement of the suspension point to the right and turning of the alignment device to the left.

When the alignment device reaches the horizontal position, liquid from tube 339 will flow quickly into tank 335, level 333 will be quickly restored and valve 327 closed suddenly. If the center of gravity of the device and a load is to the left of the suspension point then the same occurs in reverse. In this manner the desired "slowly open—quickly closed" regulation, as in the previous embodiments, is obtained using a liquid level as control medium. An advantage of this embodiment is that due to the relatively long length of the main beam, even with a small deviation of the device from the horizontal a positive controlling force is obtained and that the deadweight of the controlling means is small, whereas if a pendulum is used it has to be of relatively great weight and combined with controlling means sensitive to small controlling forces with the consequence that a heavy and in most cases a costly construction results.

Hydraulic liquid is evacuated from the upper compartments of tanks 335 and 336 to feed cylinders 302 and 303. Through valves 345, 346. The upper compartments of tanks 335 and 336 are separated from the lower compartments thereof by vertical tubes 342 and 343 so that liquid in said lower compartments cannot come into contact with the liquid in the lower compartments of the tanks, though there is an open connection by way of said tubes between the upper and lower compartments. A gas tube 344 connects the upper compartments of the two tanks. With gas pressure in the tanks 335 and 336, they will serve as one energy accumulator for bringing the alignment device back into its middle position after setting down a load, via the directional valves 345 and 346. Positioning takes place by the end stops 347. The main beam 311 can swing round pivot 307.

If the beam inclines too much, i.e., if the inclination is more than the inclination of the lines AB and AC of FIG. 2a, the beam comes into a situation in which it can slide down, in which case the device comes into a labile condition and cannot restore itself since the eccentricity will increase instead of decrease. To prevent this dangerous situation, stops 306a and 306b are provided on holder 306, which stops are adapted, when the inclination becomes too great, to contact cams 311a and 311b on main beam 311 and block the system so that sliding down is impossible.

A further safety device is formed by an artificial horizon 348 defining a track receiving a ball 349 that serves as a visual indication of the inclination of the device by virtue of movement of the ball along track 348. This device can also be used when viewing the alignment device vertically from the top of the crane. This safety device is also suitable for other embodiments of the alignment device of the invention. Other security measures may be necessary or desirable e.g., to combat unwanted influences such as wind forces, guilding forces on the load, etc. Such further measures may consist of blocking the controlling means or limiting them in their action, e.g., so that the device will adjust only to the right or left, or adjust only when the operator wants it. An example is given in FIG. 3b wherein valve 340 normally blocks the controlling means. Pulling on one or other of chains 340a sets the alignment device to adjust in one direction if the balancing member so permits. In certain circumstances the arrangement may be such that the security device is controlled by the load itself or by adding a load to the device. Another embodiment of the alignment device of FIG. 3 is formed by connecting the holder 306 to the main beam 311, e.g., by connecting the bearings of pivot 307 to the main beam. In this case the movement of the suspension point 301 relative to trolleys 311 takes place as in the embodiment of FIG. 1. A simple form of the alignment device can be provided if the eccentricity of the load is always to one side of the suspension point. Thus instead of using a pair of expanding suspending means like the cylinders 302 and 303 of FIG. 3 only one cylinder may be used in combination with a strong energy accumulator.

A modified control means which employs a liquid level is shown in FIG. 3c, wherein 348a is a slightly curved tube suspended at and rotatable about 349a. 350a is a control valve similar to the control valves of the former embodiments. With only a small inclination of the alignment device, the liquid in tube 349a exerts a relatively great controlling force on valve 350 due to the fact that the tube is curved about 349 and contains sufficient liquid to fill one side of the tube with only a small inclination represented by 351. With this arrangement undesired undulations are prevented. If desired, one can install resistances in the tube. The same effect can be obtained by using balls rolling in the tube and if the tube also contains liquid their working is intensified and their movement is damped.

FIG. 4 Embodiment

Figure 4:
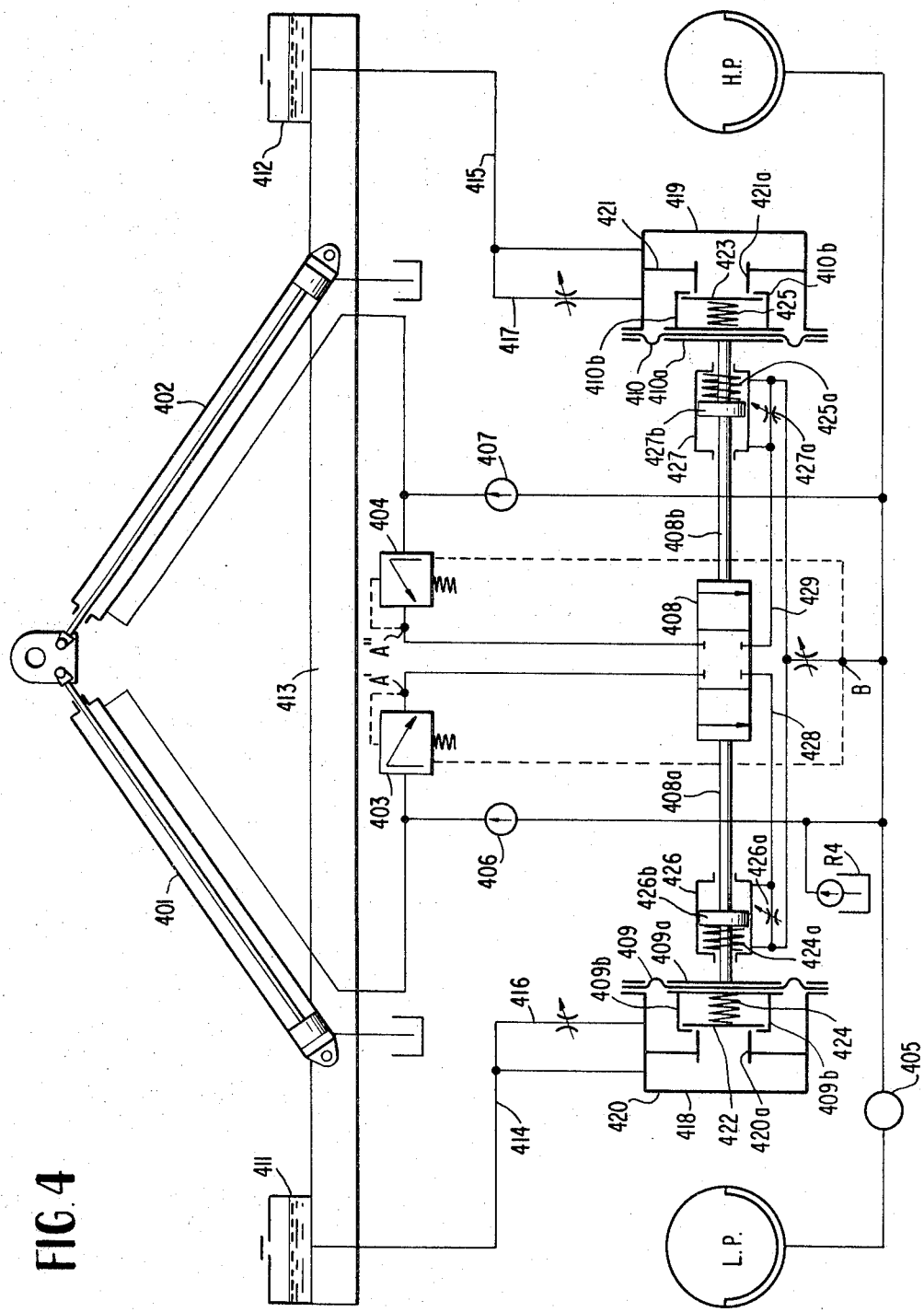
FIG. 4 is a view similar to FIG. 1 but illustrating a fourth embodiment of the invention.

This embodiment is similar to the FIG. 2 embodiment. The control means however, acts hydrostatically similar to that in the FIG. 4 embodiment. Though the basic thought is the same, the operation the hydrostatic control means in the present embodiment is not the same as that in FIG. 3. Numerals 401 and 402 denote the hydraulic adjustment cylinder the motive fluid of which can be evacuated via the pressure reduction valves 403 and 404. The quantity of evacuated fluid is independent of the pressure in the cylinders, since they maintain the same pressure difference between A', A11 and B. The evacuated fluid is received in the high-pressure accumulator HP if valve 405 is closed. If valve 405 is opened, the fluid is received in the low pressure accumulator LP. When the pistons in cylinders 401 and 402 are completely retracted by motive fluid supplied by reservoir $R_4$ and moving through directional valves 406 and 407, the accumulators are empty of motive fluid. These accumulators do the same job as springs 119 in the FIG. 1 embodiment. Valve 408 is here activated by membranes 409 and 410, on which is acting hydrostatic pressure from tanks 411 and 412 which are positioned at opposite ends of the main beam 413. Membranes 409, 410 are attached to plates 409a and 410a which in turn are secured to valve stems 408a and 409b employed to slide the valve 408. A small inclination of the beam will produce a small hydrostatical level difference between tanks 411 and 412. However, as the surfaces of plates 409a and 409b, are relatively great, a relatively great actuating force will be imposed on valve stem 408a, 408b.

Suppose the beam inclines to the right, consequently valve 408 is moved to the right against the springs 424a and 425a. In the membrane boxes 418 and 419 are partitions 420 and 421 in the center of which are short tubes 420a and 421a. These tubes are closed by plates 422 and 423 acting as valves and being pushed by weak springs 424 and 425. If the valve is tending to move to the right, the fluid in membrane box 419 is forced to pass through resistance line 417, resulting in a delayed movement of the valve. The beam drawing near the horizontal makes the springs 425 and 425a dominating. Owing to this, the valve is pushed back quickly, since there is no resistance against the flowing back of the controlling fluid, caused by lifting valve plate 422 by the hooks 409b. Spring 425 is so weak that plate 423 is lifted very easily by the fluid flow. Bringing back the valve in the middle position quickly, can be promoted too by action of cylinders 426 and 427. The fluid from the cylinders 401 and 402 is evacuated via lines 428 and 429, passing through resistances 426a and 427a. The result is a pressure difference on the pistons 426b and 427b causing a force returning the valve to its middle position, like the springs 424a and 425 also do. The easy controllability of the hydraulic resistance 426a and 426b is an advantage. By bringing back the valve in this accelerated way, the beam is not swinging through the horizontal position, when adjusting. Consequently the velocity of the motive fluid, flowing from the cylinders, is dependent of the inclination of the beam. When the beam is approaching the horizontal, the motive fluid velocity is diminishing. As a consequence, when hoisting with a very small velocity, the inclination of the beam during adjustments is very small too. This prevents damage to the load (f.e. fresh and weak concrete panels).

FIG. 5 Embodiment

Referring to FIG. 5, another embodiment of the invention is illustrated wherein the cable suspension point is moved relative to the center of gravity of the total load until vertically aligned with the latter in order to balance the load in a predetermined position. In addition, in this embodiment, the suspension point on the cable does not move vertically relative to the beam during the adjustment. This feature can be important in situations where the crane operator cannot see the load which for example may be a large container illustrated at 502 in the drawings. However in the instant embodiment, the cable suspension point is displaced vertically relative to the beam prior to the adjustment operation as will be described in more detail below.

The FIG. 5 embodiment includes a main beam 503 on which there is mounted for slidable movement, a carriage 511 to which the crane cable 501 is adapted to be secured by means of a piston and cylinder assembly. The latter includes a cylinder 504 pivotally connected at its lower end 530 to the carriage 511, and a piston 532 the upper end of which has a ring receiving cable hook 501. The load, which is container 502, may be attached to the main beam 503 in any suitable manner such as conventional twist locks represented by 503a.

In aligning the cable suspension point 501 with the center of gravity of the total load, the carriage 511 is moved by a piston and cylinder assembly including a cylinder 509 fixed with respect to the main beam 503, and a piston 509a the opposite ends of which extend from the cylinder to engage end portions 534 on the carriage. Carriage 511 may be mounted on the beam 503 by any suitable means such as opposite pairs of rollers 536 which receive the carriage 511; the rollers 536 being rotatably mounted on vertical uprights 537 which are fixed at the lower ends to main beam 503. In this manner, carriage 511 is movable in a path parallel to the main beam 503.

After the load is released, carriage 511 is moved to the normal position centered on the main beam 503, by means of fluid motors 515 fixed on the opposite ends of beam 503 and having pistons 515a engageable with the opposite ends of carriage 511 to adjust the same into the normal position.

Cylinders 509 and 515 are operated by a hydraulic system including a high-pressure accumulator 505 and a low-pressure accumulator 512. A slide control valve 507 controls the supply and exhausting of cylinder 509. Actuation of control valve 507 in response to inclination of the main beam 503 upon initially lifting the load, is achieved through a pendulum 506 the upper end of which is pivotally connected to main beam 503. Pendulum 506 is operatively connected to one end stem 507b of valve 507 to move the valve in accordance with the motion of the pendulum which in turn senses the condition of beam 503. Movement of the beam in the alignment process is delayed or retarded by a resistance or dashpot system 507a which is similar to the devices in the other embodiments described above. A pressure reducing valve 508 is placed in the line between high-pressure accumulator 505 and control valve 507. Additionally a variable restrictor 510 is placed in this line downstream of pressure reducing valve 508 to control the velocity of flow.

Operation of the presently described embodiment is initiated by lifting crane hook 501 to pull out piston 532. Assuming the container load 502 is secured to main beam 503, the crane cable is raised to lift beam 503 with the load attached thereto. As a result of any eccentric loading, beam 503 will pivot or rotate about point 530 towards the center of gravity. This will cause the pendulum 506 to move in response to the eccentric loading which after a time delay, will actuate valve 507 to permit motive fluid to flow from the high-pressure accumulator 505 through pressure reducing valve 508 and restrictor 510 to one end of cylinder 509 to actuate piston 509a for moving carriage 511 to ultimately shift the suspension point 501 into vertical alignment with the center of gravity of the total load. During this time fluid exhausting from the other end of cylinder 509 is being received in the low-pressure accumulator 512, this fluid passing through another portion of the valve 507.

When equilibrium is reached, the pendulum will shift valve 507 to stop the flow of fluid from high-pressure accumulator to cylinder 509. After the load 502 is released, piston 532 of cylinder 504 is retracted by remaining motive fluid in high-pressure accumulator 505 and by motive fluid in low-pressure accumulator 512 traveling through check valve 13, after high-pressure accumulator 505 is empty. When piston 532 is fully retracted, an arm 538 fixed to piston 532 will actuate a valve 540 to connect the opposite ends of cylinder 509 thus allowing carriage 511 to be restored into normal position by fluid motors 515. A reservoir 516 may be connected to the lower end of cylinder 504 for sump purposes. Also reservoir 516 may be connected to the conduit which connects the accumulators to the upper end of cylinder 504; there being a check valve 517 for additional supply purposes.

In addition to the pendulum 506, a manual control 518 may be employed to actuate valve 507. Manual control 518 is connected to stem 507b of valve 507 to operate the same upon manipulation by the operator.

FIG. 6 Embodiment

This alignment device, which may be compared to the FIG. 3 embodiment, includes a beam 601 for lifting the load 621, and a main frame 602 projecting oppositely to beam 601. In main frame 602 is suspended a vertical quiver frame 603 which is pivotable about pivot 604 borne in frame 602. Rotation of quiver frame 603 about 604 is limited by a beam 605 which is pivoted to the quiver frame at its upper end and connected to a rod 606 which is movable along frame 602. Movement of beam 605 and rod 606 is limited by stops 607a and 607b fixed in spaced relationship on rod 606 to be engageable with opposite sides of a stop 607c fixed to main frame 602. Although the beams 601 and 605 and the main frame 602 and quiver frame 603 have been given different names, it should be understood that structurally, they constitute a single beam when lifted by the crane cable.

Inasmuch as the main frame 602 and quiver frame 603 are made as light as possible, and the load 621 is always suspended from beam 601, the center of gravity of the combined load will always be situated to the left of pivot 604. It is therefore possible to employ only one adjustment device which is shown as cylinder 608 and its piston 608a. The bottom of cylinder 608 is attached to main frame 602 while its piston 608a is connected to a suspension piece 609 which is slidable vertically in quiver frame 603. The crane cable hook 622 is secured to suspension piece 609 by means of a cable 622a.

In this embodiment, the load is balanced by means of a counterweight 618 which is mounted by wheels 618a for movement along main frame 602 towards and away from quiver frame 603. Counterweight 618 is actuated by cable and pulley system including pulleys 611 and 612 which are mounted on the lower end of a hydraulic cylinder 610 the piston 610a of which is connected at its upper end to the suspension piece 609. The pulley system further includes a cable fixed to the quiver frame at point 617 and trained over pulley 611 and then over pulleys 614 and 616 mounted on the quiver frame and then finally connected to one end of counterweight 618. The other end of counterweight 618 has secured thereto a second cable which is fixed to the quiver frame at point 619 and trained about pulleys 613 and 615 mounted on the quiver frame and pulley 620 mounted on main frame 602. Counterweight 618 is designed such that it is located adjacent the quiver frame at the starting position of each operation, that is at the left-hand end of main frame 602, thus locating the center of gravity to the left as much as possible.

The lower ends of cylinders 608, 610 on one side of their respective pistons are connected with atmosphere while their upper ends are connected to the fluid control system which will be described below. In the starting or normal position pistons 608a and 610a are fully retracted in their cylinders with the upper ends of the cylinder being filled with motive fluid.

When load 621 is hooked on to the end of beam 601, and the crane hook 622 and cable 622a are lifted slowly, the device will be tilted to the left, causing valve 623 mounted on frame 602 to open. Consequently motive fluid from cylinder 608 will flow through valve 624 and the valve 623 and into reservoir 625. Cylinder 610 being blocked at this point by valve 624, serves as a coupling for the crane hook and the cable pulleys 611 and 612. As a result of the eccentric loading, piston rod 608a will move out of cylinder 608 and pulleys 611 and 612 will also move the same distance as piston rod 608. This motion will be transmitted to counterweight 618 to move the same away from the quiver frame a distance which will be twice the distance moved by the piston rod 608.

When the torque of counterweight 618 about pivot point 617 becomes greater than the torque of the load 621 about pivot 617, the beam will tilt to the right causing valve 623 to close and the counterweight 618 to be blocked in position because the flow of motive fluid from cylinder 608 to tank 625 will be blocked by valve 623. At this point flow of fluid out of cylinder 610 will remain blocked by valve 624. The load 621 may then be transported to its destination.

Release of the load takes place in two steps the first one occurring when the load arrives over its destination point. The operator then moves the handle of valve 624 to the left causing cylinder 608 to be blocked and cylinder 610 to be unblocked whereupon motive fluid flows from cylinder 610 into reservoir 625. The energy accumulated in the vertical displacement of the counterweight 618 will cause cylinder 610 to move downwardly to move the counterweight 618 towards the quiver frame into an equilibrium position. The load 621 may then be released after which the piston rods 608a and 610a will move downwardly into their respective cylinders under the weight of the suspension piece 609 after setting down the device while motive fluid flows from tank 625 through check valves 626 and 627 into the upper portions of cylinders 608 and 610 to restore the device in the normal position for the next operation.

It will be noted that the present embodiment, the crane cable suspension point does not move in a horizontal direction during the adjustment period. The retarded-accelerated movement of the control valves 624 is not necessary because accuracy is not that critical with this embodiment. The counterweight 618 is made stable in its movements by means of the cable which extends over pulleys 616, 614 and 611 and is fixed to point 617 on the quiver frame. This device may also be modified by employing a direct hydraulic drive for the counterweight 618.

FIG. 7 Embodiment

The FIG. 7 embodiment also employs a counterweight 716, for balancing a beam 702 with a load 701, and this embodiment is also useful in bringing the load into a covered space such as 703. Included in this embodiment is a vertical beam 704 the upper end of which is attached to the crane cable 730 by hook 732. Slidably mounted on beam 704 by rollers 705, 706 is a vertical quiver frame 702a the lower end of which supports a sprit or horizontal beam 702 adapted to pick up the load 701 as illustrated. To stabilize quiver frame 702a and to bring it back in its starting position after detaching the load, a counterweight 702b may be attached to the quiver by a cable 702c passing about a pulley 702d mounted on beam 704.

Beam 702 with load 701 is balanced in predetermined (horizontal) position by means of counterweight 716 which is fixed to the end of an arm 715 that is pivoted at 718 to beam 704 for angular movement about 718. Actuation and control of arm 715 and counterweight 716 is achieved automatically like a letter balance. A control cylinder, like cylinder 608 in FIG. 6, therefore can be omitted. Through a piston-cylinder assembly including cylinder 708 secured to quiver frame 702a and piston 708a connected to a cable 707 the counterweight can be brought in its starting position quietly after the load is on its destination (the cylinder 708 has the same function as cylinder 610 in FIG. 6). Cable 707 is trained about pulleys 709, 710 and 711 mounted on beam 704 at its upper end. Cable 707 further is trained around pulley 712 and is fixed to 712b of pulley block 712. From 712c a cable 713 is guided about a quadrant piece 714 and finally attached to an intermediate portion of arm 715. The ratios of pulleys 710, 711, 712 and the ratio of distance A and radius R of quadrant 714 theoretically are equal.

When the device is unloaded the beam will extend horizontally and beam 704 will extend vertically. After setting down the load 701, swinging down the counterweight 716 and detaching the load 701, the counterweight 702b pulls the beam 702 upwards to its staRting position. The piston 708a and the piston rod are moving in cylinder 708 by their own weight. Exhaust of cylinder 708 is controlled by valve 732 which is manually actuated by the operator. Cylinder 708 is supplied from a reservoir $R_7$ through a conduit 740 having a one-way check valve 742. Exhaust of cylinder 708 is also through conduit 740 except that the exhaust flow bypasses check valve 742 by passing through valve 732 after which it returns to reservoir R₇. To swing counterweight 710 out (counterclockwise in the drawings) to balance load 701, cylinder 708 acts as a coupling causing cable 713 to move upwardly to swing out counterweight 716 until the load 701 is balanced in horizontal position. To release the load, valve 732 is moved from position I to II to open valve 732 to conduit 740 whereby fluid will exhaust from cylinder 708 through valve 732 and into reservoir R₇. The load may then be released and the device will return to normal position by the counterweight 702b, pulling up the beam 702 and the quiver 702a.

Although the specific embodiments described above are employed to balance loads in a two-dimensional system, it will be apparent that the same concept of the invention may also be employed to balance a load with respect to the third dimension. To achieve this object, additional driving mechanisms and associated sensing devices are provided to produce the necessary relative movement in the third dimension between the work load and the center of gravity of the total load. For example the FIG. 2 embodiment could be modified for three-dimensional operation by employing three or four fluid motors arranged in pyramidal fashion with the apex connected to suspension plate 107.

Additionally, although the drive mechanisms employed in the above-described embodiment are hydraulically driven, other purely mechanical drive mechanisms may be employed instead. Moreover mechanical-hydraulic drive mechanisms, as well as electromechanical drive mechanisms may also be employed.

I claim:

1. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, and solely mechanical actuating means for moving said body suspension means relative to the center of gravity of the combined body and load until the cable suspension point and said center of gravity are vertically aligned with the body and load in a predetermined position, said actuating means being operable in response to and from energy solely derived from swinging movement of the body relative to the cable upon initially lifting the body and its load whereby the load is ultimately balanced in predetermined position.

2. Apparatus defined in claim 1 further including means for limiting movement of the body relative to the crane cable upon initial lifting of the body and load.

3. Apparatus defined in claim 1 wherein said actuating means includes a fluid motor and control means for supplying or exhausting the motor with motive fluid upon swinging movement of the body relative to the cable when the body and load are initially lifted.

4. Apparatus defined in claim 3 wherein said control means includes manually operable means mounted on said body.

5. Apparatus defined in claim 3 wherein said control means includes a control member mounted with respect to said body to move in response to movement of said body relative to the cable when initially lifting a load, and valve means connected to said fluid motor to supply or exhaust the same with motive fluid in response to actuation by said control member.

6. Apparatus defined in claim 5 wherein said control member is a pendulum having one end pivotally connected with respect to said body.

7. Apparatus defined in claim 5 further including hydraulic resistance means associated with said valve to delay movement of said valve and consequently initial operation of said fluid motor in ultimately balancing the load in predetermined position.

8. Apparatus defined in claim 7 wherein said hydraulic resistance means permits the body to be restored to a neutral position in an accelerated manner upon detachment of the load.

9. Apparatus defined in claim 1 wherein said body suspension means includes a cylinder and piston movable in the cylinder to provide movement of said body suspension means relative to the body.

10. Apparatus defined in claim 9 wherein said piston and cylinder are relatively movable to shift said body suspension means to align the cable suspension point and said center of gravity upon initial lifting of the body and load.

11. Apparatus defined in claim 10 further including restoration means for restoring the body into a predetermine position upon release of the load from the body, said restoration means being energized by vertical displacement of the body suspension means relative to the body.

12. Apparatus defined in claim 1 wherein said predetermined position of said body and load is horizontal.

13. Apparatus defined in claim 1 wherein said body suspension means is mounted for movement along the body and wherein said actuating means includes a motor for moving said body suspension means along the body to vertically align the cable suspension point and said center of gravity.

14. Apparatus defined in claim 13 wherein said body suspension means includes a piston and cylinder one of which is adapted to be connected to said cable suspension point.

15. Apparatus defined in claim 14 wherein said cylinder and piston extend generally vertically and in parallel to each other.

16. Apparatus defined in claim 1 wherein said body suspension means includes two fluid motors connected to said body and adapted to be connected to said cable, said fluid motors being operable to shift the cable suspension point into vertical alignment with said center of gravity in response to swinging movement of the body relative to the cable upon initially lifting the body and its load.

17. Apparatus for lifting loads by means of a crane cable or the like, apparatus comprising in combination, a body, a body suspension means connected to the body for suspending the body from a point on a crane cable or the like, load suspension means on the body for suspending from the body the load to be lifted, means for providing relative movement between said body suspension means and said body, and solely mechanical actuating means energized solely through mechanical energy derived from relative vertical displacement of said body suspension means and said body for producing relative horizontal movement between said body suspension means and the center of gravity of the combined body and load until the cable suspension point and said center of gravity are vertically aligned with the body and load in a predetermined position, operation of said actuating means to ultimately balance the load in a predetermined position being initiated in response to swinging movement of the body relative to the cable upon initial lifting of the body and load.

18. Apparatus defined in claim 17 wherein said actuating means is operated automatically in response to swinging movement of the body relative to the cable upon initially lifting the body and load whereby the load is ultimately balanced in predetermined position automatically.

19. Apparatus defined in claim 17 wherein said actuating means moves said load suspension means along the body until the center of gravity of the combined body and load is in vertical alignment with the cable suspension point.

20. Apparatus defined in claim 17 wherein said body includes a counterweight movable along said body, and said actuating mans is operable to move the counterweight along the body until the center of gravity of the combined body and load including the counterweight is in vertical alignment with the cable suspension point.

21. Apparatus defined in claim 19 wherein said load suspension means includes a trolley movable along said body and wherein said actuating means is operable to move said trolley along said body.

22. Apparatus defined in claim 18 wherein said actuating means includes a fluid motor and control means for supplying the motor with motive fluid upon swinging movement of the body relative to the cable when the body and load are initially lifted, said control means including a liquid level mounted on said body to move in response to swinging movement of the body relative to said cable during initial lifting of the load to control said fluid motor.

23. Apparatus defined in claim 22 wherein said control means further includes a slide valve operable in one direction in response to liquid in said liquid level, and spring means urging said slide valve in the opposite direction for restoring liquid in said liquid level.

24. Apparatus defined in claim 17 wherein said load suspension means is positioned on one side of said body and wherein the opposite side of said body contains a counterweight movable along the opposite side of said body by said actuating means to bring the center of gravity into vertical alignment with the cable suspension point, said body suspension means being located between said opposite sides of said body.

25. Apparatus defined in claim 24 wherein said body suspension mans includes a cylinder having a piston, motion transmitting means interconnecting said piston and said counterweight, said actuating means including control means for exhausting motive fluid from said cylinder to move the piston and ultimately said counterweight along said body until the center of gravity is vertically aligned with the cable suspension point.

26. Apparatus defined in claim 24 further including time delay means for delaying operation of said actuating means in response to swinging movement of the body relative to the cable upon initially lifting the body.

27. Apparatus defined in claim 26 further including restoration means for restoring the body to a neutral position when the load is detached therefrom, and means for accelerating movement of the body to the neutral position upon detachment of the load.

28. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, and actuating means for producing relative movement between said body suspension means and the center of gravity of the combined body and load until the cable suspension point and said center of gravity are vertically aligned with the body and load in a predetermined position, said actuating means being operable in response to swinging movement of the body relative to the cable upon initially lifting the body and its load whereby the load is ultimately balanced in predetermined position, and restoration means for restoring the body to a predetermined position after the load is removed from the body, said restoration means being governed by vertical displacement of said body suspension means relative to the body.

29. The apparatus defined in claim 28 wherein said restoration means includes spring means energized upon vertical displacement of said body suspension means relative to the body, and means interconnecting said spring means and said body suspension means.

30. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, and actuating means for moving said body suspension means relative to the center of gravity of the combined body and load until the cable suspension point and said center of gravity are vertically aligned with the body and load in a predetermined position, said actuating means being operable in response to swinging movement of the body relative to the cable upon initially lifting the body and its load whereby the load is ultimately balanced in predetermined position, and restoration means for restoring the body to a predetermined position after the load is removed from the body, said restoration means being governed vertical displacement of said body suspension means relative to the body.

31. Apparatus defined in claim 30 wherein said restoration means includes spring means energized upon vertical displacement of said body suspension means relative to the body and means interconnecting said spring means and said body suspension means.

32. Apparatus defined in claim 30 wherein said restoration means includes a fluid motor operatively connected to said body to move the body in a predetermined position.

33. Apparatus defined in claim 32 wherein said actuating means includes a fluid motor, and a control means for controlling the supply and exhaust of motive fluid to both of said fluid motors.

34. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, and actuating means for producing relative movement between said body suspension means and the center of gravity of the combined body and load until the cable suspension point and said center of gravity are vertically aligned with the body and load in a predetermined position, said actuating means being operable in response to swinging movement of the body relative to the cable upon initially lifting the body and its load whereby the load is ultimately balanced in predetermined position, said actuating means further including a fluid motor and control means for supplying or exhausting the motor with motive fluid upon swinging movement of the body relative to the cable when the body and load are initially lifted, said control mans including a control member mounted with respect to said body to move in response to movement of said body relative to the cable when initially lifting a load, and valve means connected to said fluid motor to supply or exhaust the same with motive fluid in response to actuation by said control member, said control member including an elongated arm pivotally connected with respect to said body and extending generally in the horizontal direction of said body.

35. Apparatus defined in claim 17 wherein said control means further includes a slide connected to said control member and said valve means, and spring means normally urging said slide and control member into a predetermined position.

36. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, and actuating means for moving said body suspension means relative to the center of gravity of the combined body and load until the cable suspension point and the center of gravity are vertically aligned with the body and load in a predetermined position, said actuating means being operable in response to swinging movement of the body relative to the cable upon initially lifting the body and its load whereby the load is ultimately balanced in predetermined position, said body suspension means including two fluid motors connected to said body and adapted to be connected to said cable, said fluid motors being operable to shift the cable suspension point into vertical alignment with said center of gravity in response to swinging movement of the body relative to the cable upon initially lifting the body and its load, said fluid motors extending at an oblique angle relative to the body and converging at the cable suspension point, said fluid motors being pivotally connected with respect to said body to pivot relative to said body while aligning the cable suspension point with the center of gravity.

37. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, actuating means for moving said body suspension means relative to the center of gravity of the combined body and load until the cable suspension point is at center of gravity or vertically aligned with the body and load in a predetermined position, said actuating means being operable in response to swinging movement of the body relative to the cable upon initially lifting the body and its load whereby the load is ultimately balanced in predetermined position, and hydraulic means for operating said actuating means, said hydraulic means including hydraulic resistance means for delaying initial operation of said actuating means in ultimately balancing the load in predetermined position.

38. Apparatus defined in claim 37 wherein said resistance means includes variable restrictors.

39. Apparatus for lifting loads by means of a crane cable or the like, the apparatus comprising in combination, a body, a body suspension means connected to the body for suspending the body from a point on a crane cable or the like, load suspension means on the body for suspending from the body the load to be lifted, means for providing relative movement between said body suspension means and said body, and actuating means energized by relative vertical displacement of said body suspension means and said body for producing relative horizontal movement between said body suspension means and the center of gravity of the combined body and load until the cable suspension point and said center of gravity are vertically aligned with the body and load in a predetermined position, operation of said actuating means to ultimately balance the load in a predetermined position being initiated in response to swinging movement of the body relative to the cable upon initial lifting of the body and load, and restoration means for restoring the body to a predetermined neutral position after the load is detached from the body, said means for producing relative vertical movement between said body suspension means and said body also being employed to energize said restoration means for restoring the body to the neutral position upon detachment of the load.

40. Apparatus for lifting loads by means of a crane cable or the like, the apparatus comprising in combination, a body, body suspension means connected to the body for suspending the body from a point on a crane cable or the like, load suspension means on the body for suspending from the body the load to be lifted, and actuating means for producing relative movement between said body suspension means and the center of gravity of the combined body and load until the cable suspension point and said center of gravity are vertically aligned with the body and load in a predetermined position, said actuating means being operable in response to swinging movement of the body relative to the cable upon initially lifting the body and its load whereby the load is ultimately balanced in predetermined position, said body suspension means and said actuating mans being constituted by at least one fluid motor having one end pivotally connected to said body and another end adapted to be connected to said cable to be operable to shift the cable suspension point into vertical alignment with said center of gravity in response to swinging movement of the body relative to the cable upon lifting the body and its load.

41. Apparatus defined in claim 40 wherein said body suspension means and actuating means further includes a second fluid motor associated with said first fluid motor, said fluid motors extending at an oblique angle relative to the body and converging at the cable suspension point, said second fluid motor being pivotally connected with respect to said body to pivot relative to said body during alignment of the cable suspension point with the center of gravity.

42. Apparatus defined in claim 40 further including control means for supplying and exhausting fluid motor upon swinging movement of the body relative to the cable, said control mans including a control member mounted with respect to said body to move in response to movement of said body relative to the cable when initially lifting a load, and valve means connected to said fluid motor to supply and exhaust the same with motive fluid in response to actuation by said control member.

43. Apparatus defined in claim 42 further including hydraulic resistance means associated with said valve means to delay movement of said valve means and consequently initial operation of said fluid motor in ultimately balancing the load in predetermined position.

44. A method of lifting and balancing a load with respect to a crane cable or the like comprising the steps of: attaching the load to a body, connecting the body with respect to the crane cable, raising the crane cable to lift the body and the load and to produce vertical displacement of the body relative to the crane cable suspension point, sensing swinging movement of the body relative to the crane cable as a result of any eccentric loading, and actuating a motor on the body in accordance with the sensed eccentric loading to align the suspension point of the cable with the center of gravity of the combined body and load while bringing said body and load into a predetermined position, and employing the said vertical displacement to charge a motive device for restoring the body relative to the crane cable in a predetermined position upon release of the load.

45. The method defined in claim 44 further including the step of vertically displacing the body relative to the crane cable suspension point prior to the alignment process for storing energy for restoring the body into a predetermined position relative to the crane cable after the load is released.

46. The method defined in claim 44 wherein the said vertical displacement of the body relative to the crane cable suspension point is also employed to actuate said motor for aligning the suspension point of the cable with the center of gravity of the combined body and load.

47. The method defined in claim 44 further including the step of producing relative vertical displacement between said body and the crane cable suspension point for actuating said motor for producing the said alignment.